(12) United States Patent
Bovenzi

(10) Patent No.: US 8,917,408 B2
(45) Date of Patent: Dec. 23, 2014

(54) SYSTEMS AND METHODS FOR IMPLEMENTING A SUPPLIES FULFILLMENT OPPORTUNITY FOR NON-MANAGED DEVICES

(75) Inventor: Lawrence J Bovenzi, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 226 days.

(21) Appl. No.: 13/557,127

(22) Filed: Jul. 24, 2012

(65) Prior Publication Data

US 2014/0029038 A1    Jan. 30, 2014

(51) Int. Cl.
*G06K 15/00* (2006.01)

(52) U.S. Cl.
USPC ............. 358/1.14; 358/1.15; 705/302; 399/9; 399/12; 399/24; 399/27; 399/29; 399/30

(58) Field of Classification Search
USPC .......................................... 358/1.14; 705/302
See application file for complete search history.

(56) References Cited

U.S. PATENT DOCUMENTS

| | | | |
|---|---|---|---|
| 6,512,894 B2 * | 1/2003 | Takemoto et al. | 399/12 |
| 7,013,092 B2 * | 3/2006 | Hayward et al. | 399/24 |
| 2001/0037267 A1 * | 11/2001 | Sato et al. | 705/29 |
| 2002/0159777 A1 * | 10/2002 | Nagata | 399/8 |
| 2011/0238704 A1 * | 9/2011 | Koike et al. | 707/802 |
| 2012/0072577 A1 * | 3/2012 | Motoyama | 709/224 |
| 2012/0176636 A1 * | 7/2012 | Ormond | 358/1.13 |

* cited by examiner

*Primary Examiner* — Benjamin O Dulaney
(74) *Attorney, Agent, or Firm* — Ronald E. Prass, Jr.; Prass LLP

(57) ABSTRACT

A system and method are provided to implement an automated scheme by which a vendor can advantageously employ remotely-monitored information on a status of non-managed office devices, gathered as part of the vendor's customer support effort regarding the office devices that the vendor manages for a customer organization under a managed service agreement or the like, to the benefit of the customer organization and the vendor. The vendor remotely monitors a status of non-managed office devices, including a status of consumables in the non-managed devices, at a customer organization's site, and upon being made aware of a change in status on one of the non-managed devices, including pending exhaustion of one or more consumables on a non-managed device, immediately offers assistance in correcting a problem with the non-managed device to include replenishment service of the nearly-exhausted consumable in the non-managed device.

13 Claims, 4 Drawing Sheets

200

Date: [DATE]
From: Vendor ABC
To: Customer Organization XYZ
Subj: Addressing A Shortfall In Office Device [IDENTIFY], The following problem is detected in Office Device [IDENTIFY].

[DESCRIBE THE PROBLEM]

Please identify which of the following actions Customer Organization XYZ would like us to take in assisting you in addressing this problem.

[ ] -- Ship one Vendor ABC [Compatible Consumable Replacement Unit Model No.] at a cost of [PRICE], plus [AMOUNT] to cover shipping and handling. DO NOT add Office Device [IDENTIFY] to our existing managed service agreement.

[ ] -- CONDUCT on-site repair of Office Device [IDENTIFY] at a cost of [PRICE] for parts/supplies and an estimated [AMOUNT] for labor. DO NOT add Office Device [IDENTIFY] to our existing managed service agreement.

[ ] -- ADD Office Device [IDENTIFY] to our existing managed service agreement modifying the existing agreement to add [AMOUNT] per month.

[ ] -- TAKE no action to address the detected problem in Office Device [IDENTIFY] at this time.

By: [ELECTRONIC SIGNATURE]
Authorized Representative
Customer Organization XYZ

We appreciate the opportunity to continue to serve you.

[INDIVIDUAL]
Representative of VENDOR ABC

FIG. 2

SYSTEMS AND METHODS FOR IMPLEMENTING A SUPPLIES FULFILLMENT OPPORTUNITY FOR NON-MANAGED DEVICES

BACKGROUND

1. Field of Disclosed Subject Matter

This disclosure relates to systems and methods for automatically integrating with a customer organization to propose correcting defects and/or fulfilling supplies requirements for consumables in office devices that are monitored but that lie outside a managed service agreement.

2. Related Art

Local digital data exchange networks have become commonplace for organizations of all types. Individual user workstations are networked together and linked, via combinations of wired and wireless communication links to central servers and processing systems, remote data storage, and myriad components that may be used for communication external to the local digital exchange network of the organization. Certain of these components may be hosted as cloud-based components, particularly for data storage and processing.

For organizations that have document production and reproduction requirements, image forming devices connected to the organizations' local digital data exchange networks are employed as components of the networked systems that meet these requirements. Organizations may make use of large numbers and types of image forming devices to particularly meet both routine and special document production and reproduction requirements for the organizations.

Market pressures lead to competition among vendors that sell, support and service, or otherwise supply, office devices, and particularly image forming devices, to customer organizations. Customer organizations are afforded an opportunity, therefore, to shop for a best value for these devices. The best value may be determined by the customer organization to be based on purchase prices for the office devices alone. Otherwise, the best value may be determined to include a combination of office device purchase prices and other consideration including, for example, an office device managed service agreement or support contract with a particular vendor for the office devices purchased or procured from the particular vendor.

The above circumstances often lead to a customer organization purchasing and using a mixture of office devices from several different vendors, some of the office devices being supported by one or more of the vendors according to a managed service agreement, and others not being supported.

Many office devices, but particularly image forming devices, include consumable components ("consumables"). Some of these consumables are customer replaceable, depending on a complexity of the image forming device or system. Others of these consumables require, or benefit from, intervention by vendor service personnel for replacement or replenishment. As automation has increased, vendors have developed systems, which they offer to their customers as part of the managed service agreements that they may provide for the office devices that they sell or supply to their customers, to remotely monitor a status of those office devices, including monitoring consumable levels for the office devices. This monitoring is generally undertaken by a vendor's remote monitoring facility conducting a combination of wired and wireless communications with individually supported or managed office devices that may be accessed via the customer organization's local digital data exchange network.

Typically, an office device managed service agreement with a particular vendor covers only the office devices sold or supplied to the customer organization by the vendor. The vendor, therefore, does not manage all of the office devices at a customer organization's site. Regardless of this, the customer organization often affords the vendor with which the customer organization has executed a managed service agreement access for monitoring purposes to all of a particular class of office devices that include those office devices that the vendor sold or supplied to the customer organization and that are subject to the managed service agreement.

SUMMARY OF THE DISCLOSED EMBODIMENTS

When a "non-managed" office device experiences a defect or runs low on consumables, a vendor monitoring the non-managed office device in conjunction with executing its managed service agreement for the managed office devices may be the first entity that is aware of the defect or low consumable condition. Though replacement consumables have become increasingly generic, vendors do not exercise any initiative to immediately provide to the customer organization (1) any indication of the detected defect or impending exhaustion of one or more consumables in a non-managed device, or (2) any offer to correct the defect or to replenish the nearly-exhausted one or more consumables in the non-managed device.

Such offers of services from vendors to their customer organizations are rarely the purview of the vendor's customer support unit that conducts the remote monitoring. Offers of services from a vendor to a current or prospective customer organization are generally left to the vendor's sales personnel. A difficulty in this structure is that the information regarding a particular defect or pending exhaustion of a particular consumable in a non-managed device is rarely communicated from the customer support unit of the vendor to the vendor's sales personnel. Additionally, even if the information were immediately made available to the vendor's sales personnel, the sales cycle between most vendors and customer organizations tends to be long. As a result an opportunity to provide a service to the customer organization to correct the defect or to sell replenishment consumables to a customer organization for use in a non-managed office device, where there is clearly an immediate need on the part of the customer organization, is missed.

Currently, a particular vendor's monitoring of a particular group of office devices that are subject to a managed service agreement at a customer organization's site may capture data for non-managed office devices. The data for the non-managed office devices may include information that indicates that consumables in one or more of the non-managed office devices are nearing exhaustion and, therefore, need to be replenished.

It would be advantageous to implement an automated scheme by which a vendor could advantageously employ remotely-monitored information on a status of non-managed office devices, gathered as part of the vendor's customer support effort regarding the office devices that the vendor manages for a customer organization subject to a managed service agreement, to the benefit of the customer organization and the vendor.

Exemplary embodiments of the disclosed systems and methods may remotely monitor a status of non-managed office devices, including a status of consumables in the non-managed devices, at a customer organization's site, and upon being made aware of a change in status on one of the non-managed devices, including detection of a defect or pending exhaustion of one or more consumables on a non-managed device, immediately offer assistance in correcting the defect with the non-managed device to include replenishment service of the nearly-exhausted consumable in the non-managed device.

Exemplary embodiments may make beneficial use of a vendor's office device managed service agreement data gathering capacity that discovers, transmits and stores information about office devices for a customer organization that are already in place to support the managed office devices by extending the data gathering to office devices at the customer organization's site that are not managed under the agreement ("non-managed office devices").

Exemplary embodiments may cause the vendor monitoring system to automatically offer the customer organization one or more options to address a detected defect in a non-managed device, including a pending or an actual exhaustion of at least one consumable in the non-managed device. The one or more options may include (1) alerting the customer organization to the nature of the difficulty; (2) offering the customer organization a one-time offer of service or one-time replenishment of a consumable to address the difficulty; and/or (3) proposing to the customer organization an extension of the office device managed service agreement, or coordination of a separate office device managed service agreement, to provide for management of the customer organization's currently non-managed office devices.

Exemplary embodiments may extend benefits to the customer organization based on the customer organization allowing the vendor to monitor both the managed and the non-managed devices at the customer organization's site. Customer organization information pertaining to a current operating status and consumable supply levels for non-managed office devices may be transmitted to the vendor's remote monitoring facility, for example, where analysis tools are applied to analyze the received data and to propose a response strategy to the customer organization according to a vendor-offered support or management scheme for the non-managed devices when the remote monitoring detects a defect in one or more non-managed office devices.

Exemplary embodiments may, when the remotely collected and analyzed data may indicate a low consumable on a non-managed office device, immediately contact the customer organization with a written offer to replenish the consumable on the non-managed office device. An automated communication may be sent to an individual in the customer organization that is authorized to make a purchase as may be outlined in the automated offer. The automated offer to replenish the consumable may include information on the consumable, including a price for the consumable. Because there is an existing managed service agreement, and likely separate financial account, established between the customer organization and the vendor, there may be no need to add additional administrative burden to complete an offered transaction. Customer organization contact information and procedures for responding to billing are presumably already in place for the managed devices under the managed service agreement.

Exemplary embodiments may further include, in an offer to address a current defect or separately, an automated offer of an option for the customer organization to add the non-managed device to the current managed service agreement between the customer organization and the vendor.

Exemplary embodiments may forward a formatted email from the vendor to a business contact at the customer organization to facilitate/ease procedures for the customer organization to respond in accepting (or declining) an offer of a one-time response to address an immediate defect, an extension of an in-place managed service agreement to cover currently non-managed office devices, or other option that may be included in any pre-formatted offer.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for automatically integrating with a customer organization to propose fulfilling servicing and supplies requirements correcting defects and/or for replenishing consumables in office devices that are monitored but that lie outside a managed service agreement will be described, in detail, with reference to the following drawings, in which:

FIG. 2 illustrates an exemplary embodiment of an automatically-generated agreement addendum to aid a customer organization in easily addressing a difficulty arising in a non-managed office device to implement the systems and methods according to this disclosure;

DETAILED DESCRIPTION OF THE DISCLOSED EMBODIMENTS

The systems and methods for automatically integrating with a customer organization to propose fulfilling servicing and supplies requirements for consumables in office devices that are monitored but that lie outside a managed service agreement, as described in this disclosure, will generally refer to this specific utility or function for those systems and methods. Exemplary embodiments described and depicted in this disclosure should not be interpreted as being specifically limited to any particular configuration of the described elements, any specific monitoring capacity or facility, or any limiting configuration of a remotely-monitored networked communicating environment, or as being specifically limited to any particular function or intended use. Any advantageous combination of the disclosed features, which may provide remote monitoring for serviceable devices that may fall outside a particular service agreement between a vendor and a customer organization, to extend service and supply opportunities from the vendor to the customer organization as definable needs arise, or like approach that may benefit from employing the described monitoring and notification scheme, are contemplated as being included in this disclosure.

Specific reference to, for example, any image forming device, as that term is commonly used throughout this disclosure, is intended to make non-limiting reference to common electronic and image forming devices, including printers and copy machines with a printing capability in a networked workspace operating environment. These devices are those to which a plurality of users may forward work product from individual user workstations, either directly, or via a wired or wireless network component or components with which the individual user workstations may communicate in order that the work product is output locally in hard copy. These terms should not be considered as limiting to any particular configuration of those respective devices, as described. These terms are intended to refer globally to a class of devices and systems that carry out what are generally understood as printing and image forming functions, as those functions would be familiar to those of skill in the art.

Specific reference to, for example, any remote monitoring facility operated by a vendor should also be understood as being exemplary only, and not limited, in any manner, to any particular class of monitoring devices, capabilities or facilities.

Figure 1:
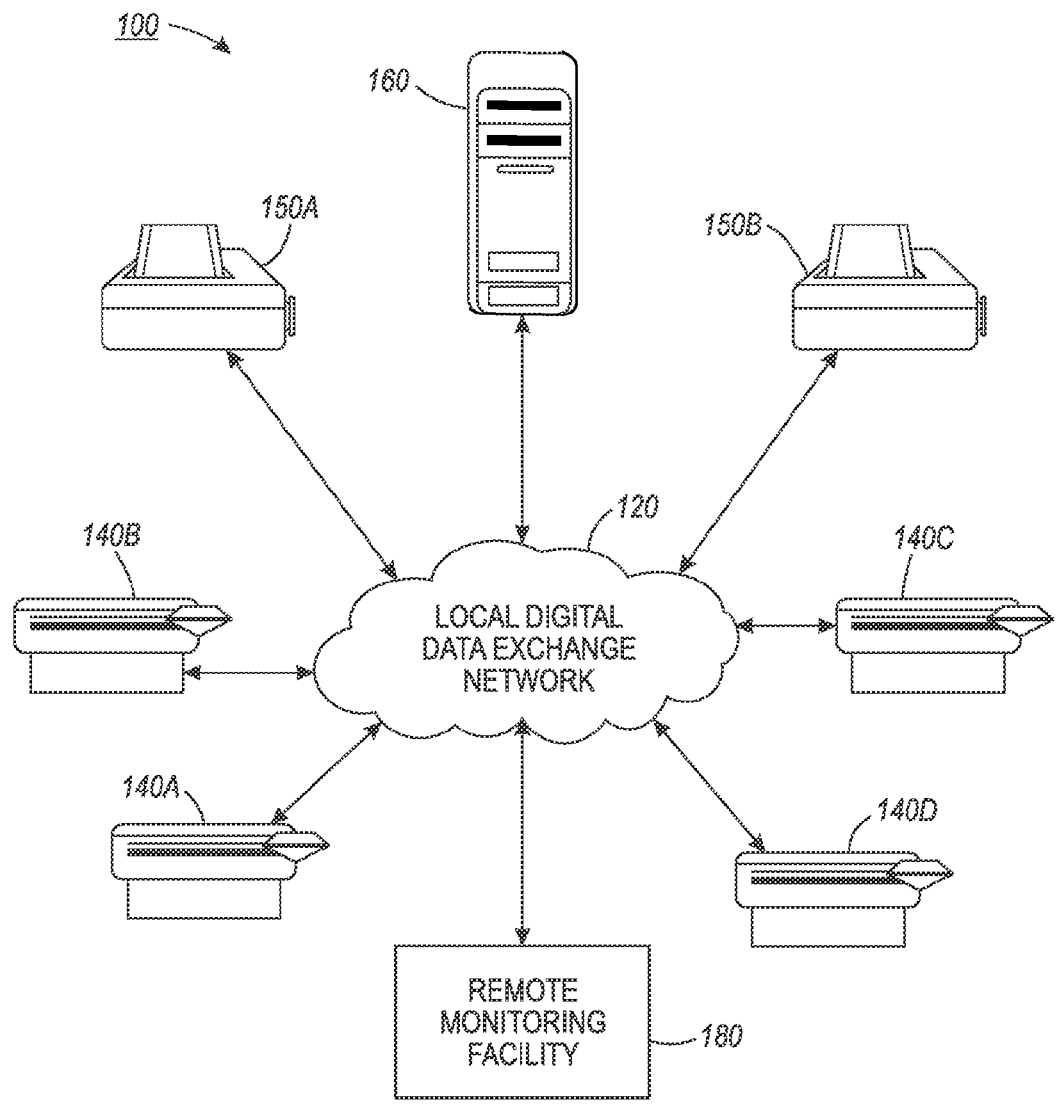
FIG. 1 illustrates an exemplary overview of a remotely-monitored local digital data exchange network that is operable with the systems and methods according to this disclosure.

FIG. 1 illustrates an exemplary overview 100 of a local digital data exchange network 120 that may be operated by a customer organization within the customer organization's site. The local digital data exchange network 120 may support a number of image forming devices of differing configurations shown in exemplary manner in FIG. 1 as first image forming devices 140A-D and second image forming devices 150A and B. As shown in FIG. 1, and as is commonly understood, the exemplary local digital data exchange network 120 may include any combination of devices including a plurality of user workstations (not shown) of various types coupled to, or in direct or networked communication with, one or more servers 160. Individual components of the exemplary local networked operating environment 120 may be individually connected to each other, or otherwise in communication with each other via some sort of central mainframe, by combinations of wired and wireless communications between individual elements. At least some of the server, mainframe, or supporting data storage and processing components may be located remotely from the customer organization's site, and may be cloud-based.

A vendor that provides some number of the image forming devices to the customer organization may have an agreement with the customer organization by which the vendor remotely monitors some or all of the image forming devices that the vendor has sold or otherwise supplied to the customer organization. The vendor may operate a remote monitoring facility 180 that communicates with the local digital data exchange network(s) 120 of a number of the vendor's customers to provide support under managed service agreements with the individual customer organizations. A typical managed service agreement may provide that the vendor monitor an operating status, and usage levels of various consumables, for a number of image forming devices which may be represented in FIG. 1 as the first image forming devices 140A-D (managed devices). With regard to the managed devices, the managed service agreement may provide that, for a fee, it is the vendor's responsibility to address defects arising in the managed devices when those defects are detected, and to replace consumables before their supply or useful life is exhausted. Such consumables may include image forming toners and inks, as well as components of the image forming devices that are subject to wear and are thereby considered to have a specified service life, which may be expressed according to a number of uses or a number of pages printed by the managed image forming device.

By virtue of its access to the managed devices, the vendor may also be granted access for monitoring by its remote monitoring facility 180, to other image forming devices that are not subject to the vendor's managed service agreement. These other image forming devices may have been bought, or otherwise procured from other vendors. These other (non-managed) image forming devices may be represented in FIG. 1 as the second image forming devices 150A and B. The vendor may be equally capable of monitoring an operating status, and a usage level of various consumables, for these non-managed image forming devices 150A and B in the same manner that it monitors these parameters with respect to the managed image forming devices 140A-D. The difference is that the vendor is generally under no obligation to take any action whatsoever regarding a detected defect, including a prospective or actual exhaustion of consumables, for the non-managed devices 150A and B.

A vendor executing a device management scheme for managed image forming devices 140A-D, via its remote monitoring facility 180 or otherwise, may be the first entity to become aware of a defect with one or more of the non-managed devices 150A and B. In such instances, there may be a benefit to be derived from an automated system by which the vendor may propose a menu of options for the vendor to undertake, should the customer organization desire, to address the detected defect in the one or more non-managed devices 150A and B. Properly formatted, the customer organization can simply accept or reject the proposals of the vendor.

It should be noted that each of the wired and wireless data communications lines between the various components shown in FIG. 1 are unnumbered because one of ordinary skill in the art will recognize that such communications could be displayed and/or depicted in a virtually a limitless combination of connections between individual components and devices attached to the exemplary local digital data exchange network 120 shown in FIG. 1.

FIG. 2 illustrates an exemplary embodiment of an automatically-generated written agreement addendum 200 to aid a customer organization in easily selecting at least one option presented by a vendor for addressing a detected defect arising in a non-managed office device to implement the systems and methods according to this disclosure. As shown in FIG. 2, the agreement addendum 200 may be addressed from the vendor to an appropriately authorized individual in the customer organization. The agreement addendum 200 may identify the non-managed image forming device in which the defect was detected according to a unique identifier for the "Office Device [IDENTIFY]." The agreement addendum 200 may then propose a menu of options as response strategies, with associated cost data that (1) the vendor may provide for responding to the detected defect, and (2) the customer organization representative may easily select and confirm by affixing his or her electronic signature to the agreement addendum 200 before retransmitting the completed agreement addendum 200 back to the vendor.

The exemplary embodiment of the agreement addendum 200 shown in FIG. 2 represents one simple example of an agreement addendum the contents of which may be modified in virtually limitless fashion to address specifics of defects detected in non-managed devices, individual options for response strategies to address the detected defects, and a current relationship between the vendor and the customer organization. In this regard, it should be understood that the depiction in FIG. 2 is meant to be a non-limiting example of a written communication from the vendor to the customer organization that may accomplish the objectives described in this disclosure.

According to the above-described scheme, an offer, for example, correct a defect or to replenish one or more consumables in a non-managed office or image forming device may allow the customer organization to easily respond to the proposed options by providing a series of check boxes, or alternatively a simple 'YES' or 'NO' to each offered option. An affirmative or 'YES' response may provide the required confirmation from an authorized representative of the customer organization to proceed as specified or outlined. Confirmation of the order to execute the requested option may act as an eSignature for the authorized representative. This confirmation may be used with established administrative and billing procedures to facilitate directing vendor actions to fulfill the order, modifying an existing managed services agreement (if required) and enabling payment processing.

Alternatively, a negative or 'NO' response may provide a record of the vendor having informed the customer organization of the detected defect and of the customer organization having indicated its desire that no further action be taken in addressing the detected defect.

A vendor may automate the process such that, each time a defect is detected in one or more non-managed image forming devices, a written notification and menu of options, such as that shown in exemplary manner in FIG. 2, may be forwarded from the vendor to the customer organization. The vendor, upon receipt of a certain number of successive negative or 'NO' responses, may curtail future communications of this sort to the customer organization, or may otherwise may only curtail future communications of this sort at the explicit request of the customer organization. In instances where no response is received to one or more successive notifications, future automated notifications may also be curtailed, or other affirmative steps to seek the customer organization's desires with regard to the notifications may be sought. The vendor may select processing options for the automated notifications that monitor an elapsed time after delivery of a notification and assess, for example, non-receipt of a response after an elapsed timeframe of 48 or 72 hours from delivery of the notification as a putative negative or 'NO' response.

The disclosed processes take advantage of existing vendor data gathering schemes to immediately initiate automated contact with customer organizations at a point in time when action is required to keep the customer organizations' non-managed image forming devices operating. Data monitored from a non-managed device may be used to automatically trigger an offer to correct a defect, or replenish a low or nearly-exhausted consumable, in the non-managed device using infrastructures that are already in place to detect like defects, to place orders and to bill the customer organizations for like services provided with respect to managed devices.

Benefits of this approach reside in the immediacy in the timing of the offer of options to a customer organization and the simplicity of the automated offer and acceptance scheme. The vendor may realize potential added sales of consumables for non-managed image forming devices that may or may not be vendor products. The vendors may further employ the disclosed schemes to expand vendor services for customer organizations by adding more office and/or image forming devices to existing managed service agreements, or to upsell the customer organization to a higher level of managed service. Customer organization satisfaction may increase because their supply orders may be filled simply, quickly and economically.

Figure 3:
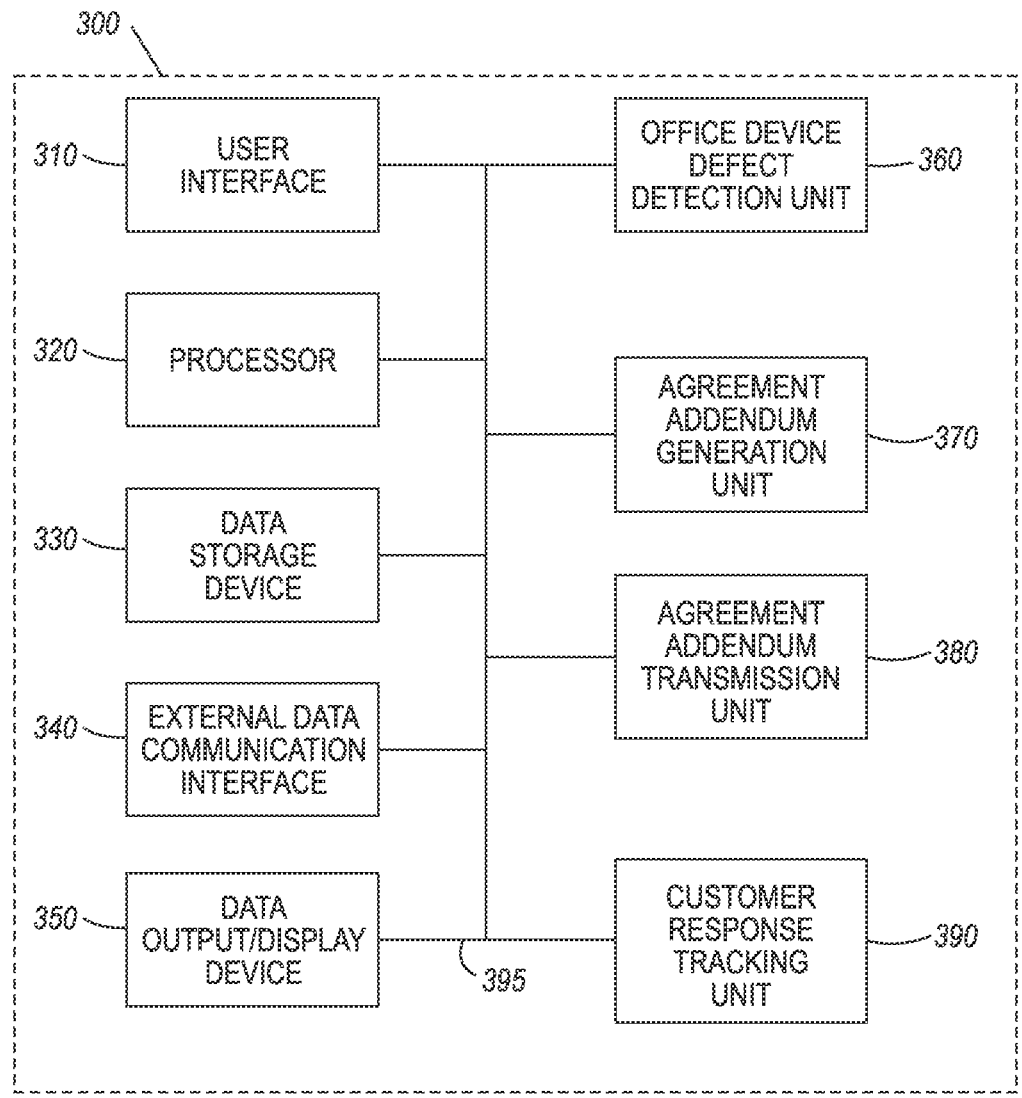
FIG. 3 illustrates a block diagram of an exemplary remote monitoring system for automatically integrating with a customer organization to propose fulfilling servicing and supplies requirements for consumables in office devices that are monitored but that lie outside a managed service agreement according to this disclosure.

FIG. 3 illustrates a block diagram of an exemplary remote monitoring system 300 for automatically integrating with a customer organization to propose fulfilling servicing and supplies requirements for consumables in office devices that are monitored but that lie outside a managed service agreement according to this disclosure. The components of exemplary remote monitoring system 300 shown in FIG. 3 may be embodied in a vendor's remote monitoring facility that may be in communication with a plurality of customer organization sites and specifically in communication with the local digital data exchange networks overseen by the individual customer organizations at their sites. Data storage and analysis elements depicted as being portions of the exemplary remote monitoring system 300 shown in FIG. 3 may be housed integrally with the other elements of the depicted system, or may be hosted, for example, in the cloud. An objective of the systems and methods according to this disclosure is to provide monitoring and support for a plurality of image forming devices located at each of several customer organizations' sites in a manner that is most efficient and effective for the vendor and is most non-intrusive to the operations of the customer organizations.

The exemplary remote monitoring system 300 may include a user interface 310 by which the user may communicate with the exemplary remote monitoring system 300. The user interface 310 may be configured as one or more conventional mechanisms common to typical computing devices and user workstations. The user interface 310 may permit a user to input information to the exemplary remote monitoring system 300 in order to facilitate the monitoring function for office devices at individual customer organization sites, such as, for example, to identify specific office devices at the individual customer organization sites that are managed devices and other specific devices at the individual customer organization sites that are non-managed devices. The user interface 310 may include, for example, a keyboard, a pointing device, a touchscreen with "soft" buttons, various components for use with a compatible stylus, a microphone by which a user may provide oral commands to the exemplary remote monitoring system 300 to be "translated" by a voice recognition program or otherwise, or other like device for user interaction with the components of the exemplary remote monitoring system 300, and for user communication with the individual local digital data exchange networks operated by the customer organizations.

The exemplary remote monitoring system 300 may include one or more local processors 320 for individually operating the exemplary remote monitoring system 300 and for carrying out the remote monitoring and customer notification functions of the exemplary remote monitoring system 300. Processor(s) 320 may include at least one conventional processor or microprocessor that interprets and executes instructions to direct specific applications and functions with regard to monitoring a status of multiple image forming devices, including a level of consumables expended by the multiple image forming devices, at one or more customer organization sites. Processor(s) 320 may initiate and control the monitoring and customer notification functions of the exemplary remote monitoring system 300.

The exemplary remote monitoring system 300 may include one or more data storage devices 330. Such data storage device(s) 330 may be used to store data or operating programs to be used by the exemplary remote monitoring system 300, and specifically the processor(s) 320. Data storage device(s) 330 may be used to provide information regarding managed service agreements with a plurality of customer organizations in, for example, a database identifying managed and non-managed office devices associated with each of the plurality of customer organizations identifying the devices each according to a unique device identifier.

Data storage device(s) 330 may include a random access memory (RAM) or another type of dynamic storage device that is capable of storing collected information, and separately storing instructions for execution of system operations by, for example, processor(s) 320. Data storage device(s) 330 may also include a read-only memory (ROM), which may include a conventional ROM device or another type of static storage device that stores static information and instructions for processor(s) 320. Further, the data storage device(s) 330 may be integral to the exemplary remote monitoring system 300, or may be provided external to, and in wireless communication with, the exemplary remote monitoring system 300, including being hosted in the cloud.

The exemplary remote monitoring system 300 may include one or more external data communication interfaces 340 by which the exemplary remote monitoring system 300 may communicate with components external to the exemplary remote monitoring system 300, such as local digital data exchange networks in multiple customer organization sites, to monitor a status of office devices, including image forming devices, in each of the customer organization sites to which the exemplary remote monitoring system 300 is connected for device monitoring. The one or more external data communication interfaces 340 may be specifically configured, as appropriate to communicate with individual customer organization local digital data exchange networks for forwarding to the customer organizations written notification of detected defects with one or more image forming devices, including a detected low level of one or more consumables in the one or more image forming devices, and of a predetermined menu of response options proposed by a vendor, with associated cost data, for the customer organization to consider and to select.

The exemplary remote monitoring system 300 may include at least one data output/display device 350 which may be configured as one or more conventional mechanisms, such as display screen or printer device, that output information to a user, for example, in a vendor's remote monitoring facility, regarding status of the exemplary remote monitoring system 300, status of a plurality of office or image forming devices monitored by the exemplary remote monitoring system 300, and status of an automated notification provided to a customer organization and an associated customer organization response to each automated notification, including instructions to dispatch service personnel and/or replacement consumables to a customer organization site.

The exemplary remote monitoring system 300 may include an office device defect detection unit 360 that is specifically configured to detect and assess a defect in one or more monitored office devices. The office device defect detection unit 360 may be informed of a fault indication in one or more monitored office devices, to include an indication of a pending end of service life condition or exhaustion condition for one or more consumables in the one or more monitored office devices.

The exemplary remote monitoring system 300 may include a specific agreement addendum generation unit 370 that may, upon detection of a defect in one or more monitored office devices, retrieve information regarding a configuration of the one or more monitored office devices with the detected defect to identify corrective actions and/or replacement parts, to include replacement consumables, in order to populate fields in a preformatted notification template by which the exemplary remote monitoring system 300 may notify the relevant customer organization of a nature of the detected defect and an offer of a menu of options for the customer organization to consider in having the vendor correct the detected defect in the manner described above.

The exemplary remote monitoring system 300 may include an agreement addendum transmission unit 380 for transmitting a formatted agreement addendum to the relevant customer organization. The agreement addendum transmission unit 380 may record a time of transmission of each agreement addendum to the relevant customer organization and/or may maintain a record of a number of attempts to transmit one or more agreement addenda to the relevant customer organization for processing in association with a received response from the customer organization.

The exemplary remote monitoring system 300 may include a customer response tracking unit 390 that may track whether, and when, a response is received from the relevant customer organization to a particularly transmitted agreement addendum. The customer response tracking unit 390 may close a particular matter when a specific time elapses after an agreement addendum including notification and a menu of response options is sent to a customer organization. Alternatively, the customer response tracking unit 390 may direct the agreement addendum transmission unit 380 to resend the notification and menu of response options a specified number of times at certain intervals until some response is received by the vendor from the customer organization.

The customer response tracking unit 390 may, upon receipt of an affirmative or 'YES' response from a customer organization requesting that the vendor perform one of the specified response options to address the current defect and/or to modify the current managed service agreement to cover the non-managed office device experiencing the defect, alert the vendor as to the customer organization's desires, thereby setting in motion the procedures for the vendor to take the requested action to correct the defect.

All of the various components of the exemplary remote monitoring system 300, as depicted in FIG. 3, may be connected by one or more data/control busses 395. These data/control bus(ses) 395 may provide wired or wireless communication between the various components of the exemplary remote monitoring system 300, whether all of those components are housed integrally together as a single unit, or are otherwise external and connected to a single integral unit as part of the exemplary remote monitoring system 300. It should be appreciated that, although depicted in FIG. 3 as an integral unit, the various disclosed elements of the exemplary remote monitoring system 300 may be arranged in any combination of sub-systems as individual components or combinations of components, integral to a single unit, or external to, and in wired or wireless communication with, the single unit of the exemplary remote monitoring system 300. In other words, no specific configuration as an integral unit or as a support unit is to be implied by the depiction in FIG. 3. Further, although depicted as individual units for ease of understanding of the details provided in this disclosure regarding the exemplary remote monitoring system 300, it should be understood that the described functions of any of the individually-depicted components may be undertaken, for example, by one or more processors 320 connected to, and in communication with, one or more data storage devices 330.

Figure 4:
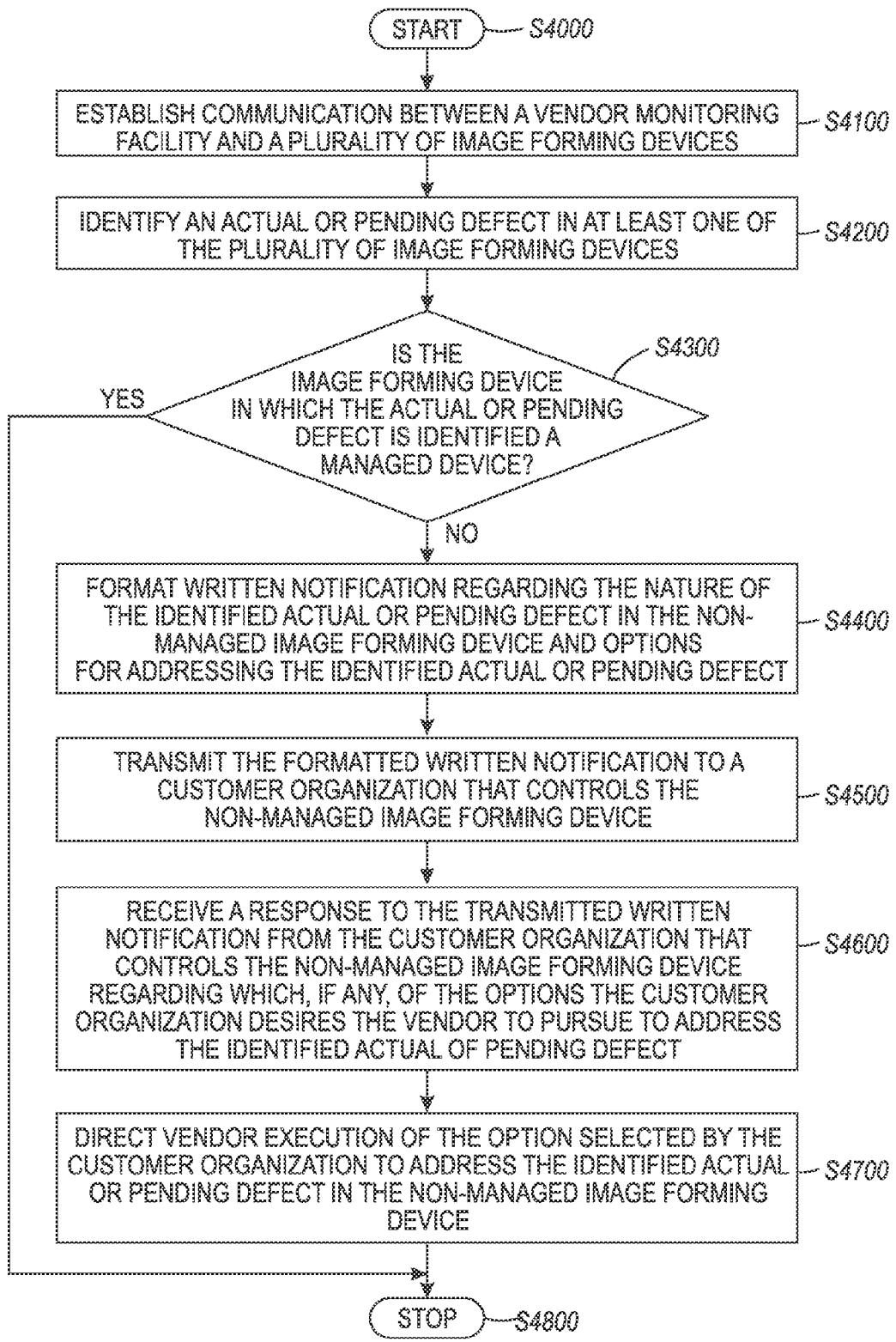
FIG. 4 illustrates a flowchart of an exemplary method for automatically integrating with a customer organization to propose fulfilling servicing and supplies requirements for consumables in office devices that are monitored but that lie outside a managed service agreement according to this disclosure.

FIG. 4 illustrates a flowchart of an exemplary method for automatically integrating with a customer organization to propose fulfilling servicing and supplies requirements for consumables in office devices that are monitored but that lie outside a managed service agreement according to this disclosure. As shown in FIG. 4, operation of the method commences at Step S4000 and proceeds to Step S4100.

In Step S4100, communications may be established between a vendor monitoring facility and a plurality of image forming devices at particular customer organization sites. This communication may be coordinated by the remote monitoring facility establishing communication with one or more local digital data exchange networks of one or more customer organizations pursuant to, for example, an office device managed services agreement executed between the vendor and the one or more customer organizations. The communications established between the vendor monitoring facility and the plurality of image forming devices may be usable to monitor a status of each of the plurality of image forming devices, including monitoring consumables levels in the plurality of image forming devices, whether the image forming devices are subject to a managed services agreement or not. Operation of the method proceeds to Step S4200.

In Step S4200, the monitoring function of the vendor monitoring facility may detect an actual or pending defect in at least one of the plurality of image forming devices with which the vendor monitoring facility communicates. The identified actual or pending defect in the at least one of the plurality of image forming devices may be a pending exhaustion of a consumable in an image forming device. Operation of the method proceeds to Step S4300.

Step S4300 is a determination step. In Step S4300, a determination is made as to whether the image forming device in which the actual or pending defect is identified is a managed device.

If, in Step S4300, it is determined that the image forming device in which the actual or pending defect is identified is a managed device, operation of the method proceeds to Step S4800, where operation of the method ceases. If the image forming device in which the actual or pending defect is identified is a managed device, the correction of the defect is covered by the managed services agreement between the vendor and the relevant customer organization for the office device and is, therefore, outside the scope of the systems and methods according to this disclosure.

If, in Step S4300, it is determined that the image forming device in which the actual or pending defect is identified is not a managed device, operation of the method proceeds to Step S4400.

In Step S4400, a written notification may be automatically formatted for transmission to the relevant customer organization that controls the non-managed image forming device in which the actual or pending defect has been identified. The image forming device may be identified to the vendor monitoring facility by a unique device identifier. The automatic formatting of the written notification may include populating fields that identify the device in question, specify the nature of the problem or defect to be addressed, and propose a series of options for addressing the problem or defect, including costs associated with each of the proposed vendor options. The offered vendor options may include, for example, sending replacement consumables to the customer organization for customer replacement in the image forming device to correct the defect, dispatching vendor-associated service personnel to the customer organization site to correct the defect in the image forming device, and/or modifying the office device managed services agreement between the vendor and the customer organization to include management of the non-managed office device. Operation of the method proceeds to Step S4500.

In Step S4500, the formatted written notification may be transmitted to the relevant customer organization that controls the non-managed image forming device for consideration of the vendor-proposed corrective options. A time of dispatch of the formatted written notification may be recorded. Operation of the method proceeds to Step S4600.

In Step S4600, a response to the transmitted written notification may be received from the customer organization that controls the non-managed device. The response may specify which, if any, of the vendor-proposed options the customer organization may want for the vendor to undertake in addressing the actual or pending defect in the non-managed device. Operation of the method proceeds to Step S4700.

In Step S4700, the appropriate components of the vendor may be directed to execute procedures appropriate to fulfill the customer organization's requested option to address the defect. Operation of the method proceeds to Step S4800, where operation of the method ceases.

The above-described exemplary systems and methods reference certain conventional components to provide a brief, general description of suitable image forming devices and wireless and networked operating environments that may be particularly adaptable to the monitoring and notification schemes according to the described systems and methods. Those skilled in the art will appreciate that other embodiments of the disclosed subject matter may be practiced with many types of local digital data exchange networks and image forming devices using the monitoring and notification tools in networked environments in many different configurations.

The exemplary depicted sequence of executable instructions described in the above method represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 4, and the accompanying description, except where a particular method step is a necessary precondition to execution of any other method step. Individual method steps may be carried out in sequence or in parallel, in simultaneous or near simultaneous timing, as appropriate.

Although the above description may contain specific details, they should not be construed as limiting the claims in any way. Other configurations of the described embodiments of the disclosed systems and methods are part of the scope of this disclosure.

It will be appreciated that a variety of the above-disclosed and colorably-related features and functions, or alternatives thereof, may be desirably combined into many related different systems or applications. Various alternatives, modifications, variations, or improvements therein may be subsequently made by those skilled in the art which are also intended to be encompassed by the following claims.

What is claimed is:

1. A method for responding to a detected defect in an office device, comprising:
   establishing vendor communication with a plurality of office devices overseen by a customer, the plurality of office devices including a first device group in which office devices are vendor supported devices according to a service agreement between a vendor and the customer, and a second device group in which office devices are not now and have not been previously vendor supported;
   detecting, with a processor, a defect in at least one of the plurality of office devices;
   determining, with the processor, that the at least one of the plurality of office devices in which the defect is detected is an office device belonging to the second device group;
   automatically generating, with the processor, a proposal of options for actions to be undertaken by the vendor to correct the detected defect;
   forwarding the automatically generated proposal of options for vendor action to the customer;
   receiving, with the processor, a response from the customer to the proposal indicating which of the options for vendor action the customer selects; and directing, with the processor, completion by the vendor of the customer selected vendor action to address the defect, the automatically generated proposal of options for vendor action being contained in an email that is generated and automatically dispatched to an authorized representative for the customer and that includes notification to the customer of the nature of the detected defect, cost data associated with each of the options for vendor action to correct the detected defect, and a scheme by which the customer selects one or more of the options for vendor action, and the options for vendor action including a request to convert the office device in which the defect is detected from belonging to the second device group to belonging to the first device group.

2. The method of claim 1, each of the plurality of office devices being identified by a unique identifier, the determining comprising the processor comparing the unique identifier for the at least one of the plurality of office devices in which the defect is detected to a list of unique identifiers for office devices indicating which of the plurality of office devices belong to the first device group and which of the plurality of office devices belong to the second device group.

3. The method of claim 1, the plurality of office devices including at least one image forming device, and the detected defect including a low level indication for one or more consumables in the at least one image forming device belonging to the second device group.

4. The method of claim 3, the automatically generated proposal including notification to the customer of the low level indication for the one or more consumables in the at least one image forming device, and a price for a replacement consumable.

5. The method of claim 1, the establishing of the vendor communication with the plurality of office devices overseen by the customer comprising establishing communication between a vendor's remote monitoring facility and a customer's local area network in communication with the plurality of office devices.

6. A system for responding to a detected defect in an office device, comprising:

at least one external communication interface for establishing vendor communication with a plurality of office devices overseen by a customer, the plurality of office devices including a first device group in which office devices are vendor supported devices according to a service agreement between a vendor and the customer, and a second device group in which office devices are not now and have not been previously vendor supported;

a processor that is programmed to:
 detect a defect in at least one of the plurality of office devices; and
 determine that the at least one of the plurality of office devices in which the defect is detected is an office device belonging to the second device group; and a proposal generating device that
 automatically generates a proposal of options for actions to be undertaken by the vendor to correct the detected defect, and
 forwards the automatically generated proposal of options for vendor action to the customer via the at least one external communication interface, the automatically generated proposal of options for vendor action being contained in an email that is generated and automatically dispatched to an authorized representative for the customer and that includes notification to the customer of the nature of the detected defect, cost data associated with each of the options for vendor action to correct the detected defect, and a scheme by which the customer selects one or more of the options for vendor action, the options for vendor action including a request to convert the office device in which the defect is detected from belonging to the second device group to belonging to the first device group, and the processor being further programmed to:
 receive a response from the customer to the proposal indicating which of the options for vendor action the customer selects; and
 direct completion by the vendor of the customer selected vendor action to address the defect.

7. The system of claim 6, further comprising a storage device storing a database of unique identifiers for the plurality of office devices indicating which of the plurality of office devices belong to the first device group and which of the plurality of office devices belong to the second device group, the processor determining that the at least one of the plurality of office devices in which the defect is detected belongs to the second device group by comparing the unique identifier for the at least one of the plurality of office devices to the database.

8. The system of claim 6, the proposal generating device populating fields in a pre-formatted form that notifies the customer of the nature of the detected defect and cost data associated with each of the options for vendor action to correct the detected defect, the pre-formatted form including a series of at least one of (1) checkboxes and (2) YES/NO selections associated which each of one or more vendor actions by which the customer selects the one or more of the vendor actions.

9. The system of claim 6, the plurality of office devices including at least one image forming device, and the detected defect including a low level indication for one or more consumables in the at least one image forming device.

10. The system of claim 9, the automatically generated proposal including notification to the customer of the low level indication for the one or more consumables in the at least one image forming device, and a price for a replacement consumable.

11. A non-transitory computer-readable medium storing instructions which, when executed by a processor, cause the processor to execute a method for responding to a detected defect in an office device, the method comprising:

establishing vendor communication with a plurality of office devices overseen by customer, the plurality of office devices including a first device group in which office devices are vendor supported devices according to a service agreement between a vendor and the customer, and a second device group in which office devices are not now and have not been previously vendor supported;

detecting a defect in at least one of the plurality of office devices;

determining that the at least one of the plurality of office devices in which the defect is detected is an office device belonging to the second device group;

automatically generating a proposal of options for actions to be undertaken by the vendor to correct the detected defect; forwarding the automatically generated proposal of options for vendor action to the customer;

receiving a response from the customer to the proposal indicating which of the options for vendor action the customer selects; and directing completion by the vendor of the customer selected vendor action to address the defect, the automatically generated proposal of options for vendor action being contained in an email that is generated and automatically dispatched to an authorized representative for the customer and that includes notification to the customer of the nature of the detected defect, cost data associated with each of the options for vendor action to correct the detected defect, and a scheme by which the customer selects one or more of the options for vendor action, and the options for vendor action including a request to convert the office device in which the defect is detected from belonging to the second device group to belonging to the first device group.

12. The non-transitory computer-readable medium of claim 11, the plurality of office devices including at least one image forming device, and the detected defect including a low level indication for one or more consumables in the at least one image forming device.

13. The non-transitory computer-readable medium of claim 12, the automatically generated proposal including notification to the customer of the low level indication for the one or more consumables in the at least one image forming device, and a price for a replacement consumable.

* * * * *